Figure 1:
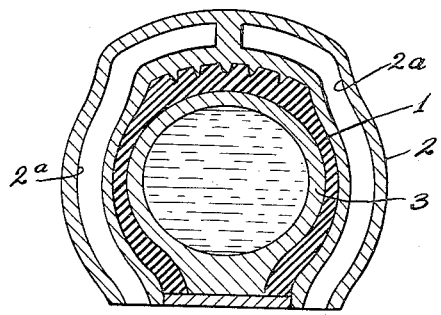

March 3, 1936.  F. A. SEIBERLING ET AL  2,032,508
METHOD OF VULCANIZING TIRES
Filed Dec. 26, 1933

INVENTORS
Frank A. Seiberling,
BY Clinton A. Carlton

Pays, Oberlin & Ray
ATTORNEYS

Patented Mar. 3, 1936

2,032,508

UNITED STATES PATENT OFFICE 2,032,508

METHOD OF VULCANIZING TIRES

Frank A. Seiberling and Clinton A. Carlton, Akron, Ohio, assignors to The Seiberling Rubber Company, Akron, Ohio, a corporation of Ohio Application December 26, 1933, Serial No. 703,938

6 Claims. (Cl. 18—53)

This invention relates in general to a method of vulcanization, but, as indicated, has reference more particularly to a method of vulcanizing automobile tires and the like.

At the present time, the curing of automobile tires is usually accomplished in metal molds, the tire being placed in the mold and expanded against the inner surface thereof by means of a thick, heavy rubber bag which is disposed within the mold and inflated by air under pressure. Dry steam at a relatively high temperature is then conducted through the passages provided in the mold and heat is thus applied to the outer surface of the tire. It is virtually impossible by this method to obtain a perfect cure of the tire for the reason that when the proper degree of vulcanization is reached in the outer portions of the tire, the inner portions or the cord plies and the rubber around the cords in the plies, may still be in an undercured condition. On the other hand, if, as is necessary, the application of such heat is continued until the inner portions are properly vulcanized, the outer portions in direct contact with the mold will be over-vulcanized, leading to so-called flex-cracking and other defects which materially reduce the life of the tire in service. Furthermore, owing to the difficulty of properly regulating the various factors in the mold-vulcanizing process, the vulcanization is often prolonged to such an extent as to cause overheating of the cord plies of the tire with a resultant decrease of the flexing qualities thereof.

In spite of every precaution which may be taken to insure uniform and thorough vulcanization of the tires, a tire may, to all outward appearances, appear to be perfectly cured, but no inspection can detect undercure or overcure on the inside of the tire which may later develop into a weakness, causing separation of tread or cord plies and possibly a blowout on the road.

It has also been proposed to secure a penetration of heat into the tire through the inner as well as the outer surface thereof, as by forcing hot water through the rubber bag used in the aforesaid process. While this constitutes something of an improvement, the heating effect of the water through the wall of the rubber bag is not as great as that of the steam through the wall of the metal mold, and owing to the thickness of the base of the bags usually employed for this purpose, access of heat to the beads of the tires is rendered extremely difficult, rubber being a poor conductor of heat, and as a result, the bead portions of the tires are not properly vulcanized.

The molds which are used for curing tires are usually of complicated and costly construction and constitute an important item of the cost of production of the tires. These molds are relatively short-lived, and the economics of tire-making accordingly require that each mold be used for the production of a maximum number of tires.

The present invention accordingly has as primary objects the uniform curing of the tire, the improvement of the flexing qualities of the cord plies and the wear resistance of the tread of the tire, and a considerable increase in the production of tires per mold by shortening the period of use thereof per tire.

To the accomplishment of the foregoing and related ends, said invention, then, consists of the means hereinafter fully described and particularly pointed out in the claims; the annexed drawing and the following description setting forth in detail one method constituting, however, but one of various applications of the principle of our invention.

In said annexed drawing:—

Figure 2:
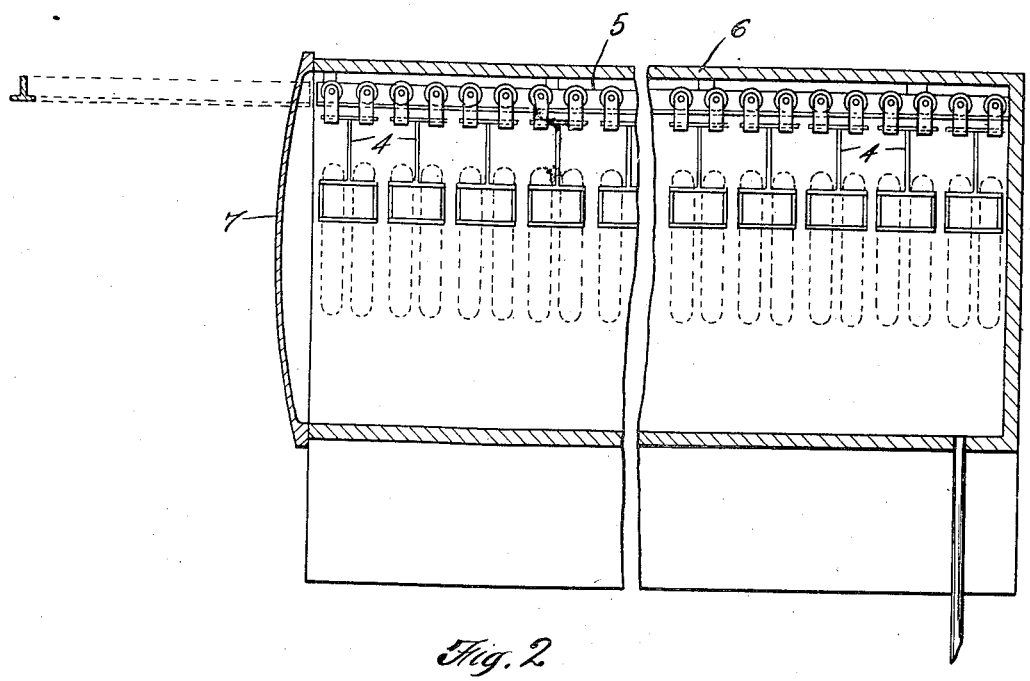

Fig. 1 is a fragmentary cross-sectional view, showing the first stage of the curing of tires in accordance with the present improved process; and Fig. 2 is a view showing in a more or less diagrammatic manner the second stage in the curing of the tires.

In accordance with our improved process, the tire 1, which is in an uncured condition, is placed within an annular metallic mold 2, which, as shown in Fig. 1, is provided in its walls with passageways 2a. An annular rubber bag 3, which is disposed within the mold, is then inflated, as by means of hot water, causing the tire to be expanded into contact with the wall of the mold. Steam is also conducted through the passageways 2a of the mold and the temperature of the steam and hot water are preferably so controlled that the heat penetrating the tire from the inside meets the heat penetrating the tire from the outside at approximately the center of the tire. The heating is continued for a period of time sufficient to "set" the tire, that is, solidify the rubber and cotton so that the tire may be removed from the mold without distortion. This "set cure" is a partial vulcanization of the tire and proceeds to a point somewhat beyond the point at which the tire would "blow" upon removal thereof from the mold.

The "blow" point may be described as that point in the vulcanization of the tire at which, due to the presence of occluded gases, such as steam and hydrogen sulphide, formed within the tire during the vulcanizing treatment, the tire will, upon removal from the mold, still tend to assume a somewhat puffed or blown condition, at least in places. This condition may be accompanied by a separation of the tread from the cord plies, and by other defects, which are not discernible upon a mere casual inspection of the tire. The blow point, or rather the point after which the tire, upon removal from the mold, will no longer tend to assume a puffed or blown condition, varies of course in accordance with the size and composition of the tire, the temperature used and other factors, but for any given size of tire and composition, may be empirically determined with a fair degree of accuracy.

We have found in practice that if the tire is removed from its mold directly after the blow point has been reached, the tire will exhibit no tendency to blow, but will be properly set. It will, however, be only partially vulcanized, but no portions of the tire will have been over-cured. The duration of this "set cure" will vary with the size of the tire and the other factors mentioned above, but in general, it may be stated that it is from about 30% to about 50% less than the time consumed in the full vulcanizing treatments by methods heretofore employed. In practice, we have found that the tires may be safely removed from the mold from about four to six minutes after the blow point is reached. By thus reducing the time at which the cord plies are subjected to the relatively high curing temperature, the flexing qualities thereof are preserved. Furthermore, by reducing the length of time during which each tire is in the mold, the production capacity of the mold is obviously greatly increased.

Following the "set cure", the partially vulcanized tires are removed from the molds and hung on saddles 4, which as shown in Fig. 2, are movably mounted on a rail or track 5, extending through a cylindrical chamber 6, provided with a door 7, adapted to be swung outwardly when the chamber is being filled with tires. The tires within the chamber are then exposed to the action of water vapor, i. e. steam, at a temperature from about 250° F. to 265° F., and preferably at a temperature of approximately 258° F. for a length of time sufficient to complete the vulcanization of the tires. This method of completing the vulcanization is not only efficient in that it involves a direct application of heat of the same degree to all surfaces of the tires, both inside and out, but is also safe, as the temperature employed is sufficiently low to avoid the possibility of over-curing portions of the tire. Moreover, the cost of the treatment is low as compared with the mold vulcanizing treatment, as a large number of tires, e. g., batches of 40 or more, may be simultaneously heated in equipment which is relatively inexpensive as compared with the cost of molds and accessory apparatus for vulcanizing a similar number of tires. Consequently, this treatment, which we term a "final cure", may be conducted leisurely and for a period of time which will insure uniform vulcanization of the tire.

As already stated, the duration of the "set" and "final" cures will vary, not only according to the size of the tire which is being vulcanized, but also with the character of the compound or composition used, as well as the temperatures employed. However, the temperatures and times of vulcanization of various sizes of tires by existing, as well as by the present improved method, set forth in the table below, may be taken as typical:—

| Size of tire | Time and temperature of vulcanization by existing methods | Time and temperature of vulcanization by improved methods |
|---|---|---|
| Small | 40 min. at 295° F. | 32 min. at 295° F. (set cure) |
| | | 45 min. at 258° F. (final cure) |
| Medium | 90 min. at 280° F. | 50 min. at 280° F. (set cure) |
| | | 55–75 min. at 258° F. (final cure) |
| Large | 75 min. at 240° F. | 60 min. at 258° F. (set cure) |
| | 60 min. at 258° F. | 60 min. at 274° F. (set cure) |
| | 75 min. at 274° F. | 65–90 min. at 258° F. (final cure) |

In the above table, the data given for the large size of tire is that for a single cure which, as indicated, is carried out in three stages, that is to say, under existing methods, the tire is vulcanized at 240° F. for 75 minutes, then at 258° F. for 60 minutes, and finally at 274° F. for 75 minutes. By the improved method, a single cure comprises the set cure which is carried out in two stages, as indicated, and the final cure at 258° F. for 65 to 90 minutes.

As a result of the present improved method, the tires are cured uniformly throughout, the flexing qualities of the cord plies are improved, the wear resistance of the tread portions of the tire materially improved, and the production of tires per mold considerably increased.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. The method of vulcanizing tires which consists in initiating the vulcanization in a tire-forming mold, continuing the vulcanization in such mold to a point beyond that at which the tire would tend to "blow" if removed from the mold but short of complete vulcanization of the tire, removing the partially cured tire from the mold, and completing the vulcanization by exposing the tire to the direct action of steam.

2. The method of vulcanizing tires which consists in initiating the vulcanization in the tire-forming molds, continuing the vulcanization in such molds for a brief period after the "blow" point is reached, removing the tires from the molds and completing the vulcanization by exposing the tires to the direct action of steam.

3. The method of vulcanizing tires which consists in initiating the vulcanization in the tire-forming molds, continuing the vulcanization in such molds for several minutes after the "blow" point is reached, removing the tires from the molds and completing the vulcanization by exposing the tires to the direct action of water vapor at a temperature of from about 250° F. to about 265° F.

4. The method of vulcanizing tires which consists in initiating the vulcanization in the tire-forming molds, continuing the vulcanization in such molds for a brief period after the "blow" point is reached, removing the tires from the molds and completing the vulcanization by exposing the tires to the direct action of water vapor at a temperature of approximately 258° F.

5. The method of vulcanizing tires which consists in initiating the vulcanization in the tire-forming molds, continuing the vulcanization in such molds until about four to six minutes after the "blow" point is reached, removing the tires from the molds and completing the vulcanization by exposing the tires to the direct action of water vapor.

6. The method of vulcanizing tires which consists in initiating the vulcanization in tire-forming molds, continuing the vulcanization in such molds until about four to six minutes after the "blow" point is reached, removing the tires from the molds and completing the vulcanization by exposing the tires to the direct action of water vapor at a temperature of from about 250° F. to about 265° F.

FRANK A. SEIBERLING.
CLINTON A. CARLTON.